(12) United States Patent
Brisson et al.

(10) Patent No.: US 8,532,244 B2
(45) Date of Patent: Sep. 10, 2013

(54) SYSTEM AND METHOD FOR DETERMINING COOLANT LEVEL AND FLOW VELOCITY IN A NUCLEAR REACTOR

(75) Inventors: Bruce William Brisson, Galway, NY (US); William Guy Morris, Rexford, NY (US); Danian Zheng, Clifton Park, NY (US); David James Monk, Rexford, NY (US); Biao Fang, Clifton Park, NY (US); Cheryl Margaret Surman, Albany, NY (US); David Deloyd Anderson, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 1387 days.

(21) Appl. No.: 11/762,986

(22) Filed: Jun. 14, 2007

(65) Prior Publication Data

US 2008/0310576 A1 Dec. 18, 2008

(51) Int. Cl.
*G21C 17/00* (2006.01)
(52) U.S. Cl.
USPC .......................................... 376/246; 376/258
(58) Field of Classification Search
USPC ...................................................... 376/258
See application file for complete search history.

(56) References Cited

U.S. PATENT DOCUMENTS

| | | | |
|---|---|---|---|
| 3,280,627 A | 10/1966 | Cousins et al. | |
| 4,371,790 A | 2/1983 | Manning et al. | |
| 4,440,717 A | 4/1984 | Bevilacqua et al. | |
| 4,592,230 A | 6/1986 | Waring et al. | |
| 4,786,857 A | 11/1988 | Mohr et al. | |
| 4,859,076 A | 8/1989 | Twerdochlib | |
| 4,965,041 A | 10/1990 | Becker | |
| 4,977,385 A | 12/1990 | McQueen | |
| 5,073,335 A * | 12/1991 | Townsend | 376/373 |
| 5,117,216 A | 5/1992 | McQueen | |
| 5,134,772 A | 8/1992 | McQueen | |
| 5,152,049 A | 10/1992 | McQueen | |
| 5,167,153 A | 12/1992 | McQueen | |
| 5,201,223 A | 4/1993 | McQueen | |

(Continued)

FOREIGN PATENT DOCUMENTS

| | | |
|---|---|---|
| EP | 618428 A2 | 5/1994 |
| EP | 627615 A1 | 7/1994 |
| WO | 03095954 A1 | 4/2003 |

OTHER PUBLICATIONS

Persson, Magnus and Wraith, Jon M., Shaft-Mounted Time Domain Reflectometry Probe for Water Content and Electrical Conductivity Measurements, Vadose Zone Journal, p. 316-319, 2002, Soil Science Society of America.*

*Primary Examiner* — Timothy A Brainard
(74) *Attorney, Agent, or Firm* — Ann M. Agosti

(57) ABSTRACT

A boiling water reactor includes a reactor pressure vessel having a feedwater inlet for the introduction of recycled steam condensate and/or makeup coolant into the vessel, and a steam outlet for the discharge of produced steam for appropriate work. A fuel core is located within a lower area of the pressure vessel. The fuel core is surrounded by a core shroud spaced inward from the wall of the pressure vessel to provide an annular downcomer forming a coolant flow path between the vessel wall and the core shroud. A probe system that includes a combination of conductivity/resistivity probes and/or one or more time-domain reflectometer (TDR) probes is at least partially located within the downcomer. The probe system measures the coolant level and flow velocity within the downcomer.

8 Claims, 3 Drawing Sheets

(56) References Cited

U.S. PATENT DOCUMENTS

| | | | |
|---|---|---|---|
| 5,211,904 A | 5/1993 | Oosterkamp | |
| 5,220,514 A | 6/1993 | John | |
| 5,221,916 A | 6/1993 | McQueen | |
| 5,323,430 A * | 6/1994 | Termaat et al. | 376/258 |
| 5,355,727 A | 10/1994 | McQueen | |
| 5,553,494 A | 9/1996 | Richards | |
| 5,565,851 A | 10/1996 | Richards et al. | |
| 5,615,573 A | 4/1997 | Lee | |
| 5,798,698 A | 8/1998 | Politt et al. | |
| 5,913,250 A | 6/1999 | Wible | |
| 6,208,254 B1 | 3/2001 | McQueen et al. | |
| 6,219,398 B1 | 4/2001 | Fittz et al. | |
| 6,628,202 B2 | 9/2003 | McQueen et al. | |

* cited by examiner

SYSTEM AND METHOD FOR DETERMINING COOLANT LEVEL AND FLOW VELOCITY IN A NUCLEAR REACTOR

STATEMENT REGARDING FEDERALLY SPONSORED RESEARCH & DEVELOPMENT

This invention was made with Government support under contract numbers DE-FC07-05ID14635 and DE-FC07-05ID14636 awarded by the Department of Energy. The Government has certain rights in the invention.

BACKGROUND

The invention relates generally to an apparatus for determining fluid level and flow velocity in a single-phase and/or two-phase fluid system, and in particular to an apparatus for determining fluid level and flow velocity in a downcomer of a natural recirculation boiling water reactor (BWR) using a combination of electrical conductivity (EC) probes, thermal conductivity (TC) probes and one or more time-domain reflectometry (TDR) probes.

Boiling water nuclear reactors generally comprise steam-generating plants in which reactor water coolant is circulated through a core of heat-producing fissionable nuclear fuel to transfer thermal energy from the fuel to the coolant, thereby generating a two-phase steam-water mixture emerging from the fuel core. Using steam-water separators and steam dryers positioned downstream from and above the core, the upward-flowing mixture from the heating core becomes partitioned into its respective phases, whereupon the steam is piped from the reactor vessel for use in steam-driven turbines or other equipment while the liquid water phase is recycled as coolant water.

In typical boiling water reactors used for power generation, reactor coolant water is circulated continuously around a flow path as follows: up through a heat-producing fuel core; then up through an upper outlet plenum superimposed above the fuel core which serves to collect and channel all the coolant passing up through the fuel core. Then, the coolant water passes through an assembly of steam separators positioned above the core outlet plenum; and then travels finally back downward outside of the core, along an annular region, known as the "downcomer," to recycle the liquid coolant and return it to the fuel core.

It has previously been known that the level of a liquid can be determined using electrical conductivity (EC) probes. In such a conductivity probe, several waveforms can be used for interrogation. In one example, a constant voltage (AC) is imposed across a gap between two electrodes. The magnitude of the resulting current is determined by the ability of the medium to conduct the current, where admittance is the reciprocal of impedance. In another example, a constant voltage (DC) is imposed across a gap between two electrodes. The magnitude of the resulting current is determined by the ability of the medium to conduct the current, where conductance is the reciprocal of resistance.

In a TDR-based level measurement device, one or a series of low-energy electromagnetic impulses generated by the sensor's circuitry is propagated along a thin wave guide (also referred to as a probe)—usually consists of one single long electromagnetic wave conductor or an array of long conductors, such as a metal rod, a steel cable, or a metal thin tube with a coaxially fixed metal rode in the middle. When these impulses hits the surface of the medium to be measured, an impedance mismatch (due to the different dielectric constants of the two phases) causes part of the impulse energy to be reflected back up the probe to the circuitry (due to the mismatch of the dielectric property) which then calculates the fluid level from the time duration between the impulse sent and the impulse reflected (in nanoseconds).

In the operation of such natural circulation nuclear reactors, the maximum power per fuel assembly unit critically depends upon this recirculation coolant flow through the fuel core. In addition, significant bundle natural circulation flow, which is nearly compatible to that of forced circulation BWR designs, is achieved in an Economic Simplified Boiling Water Reactor (ESBWR) design. Thus, it is desirable to accurately measure the flow rate of this recirculation flow through the downcomer of the nuclear reactor, particularly in a natural circulation BWR.

It would therefore be desirable to provide a system and method for measuring in-core fluid level and flow velocity in a multiple phase fluid system, such as in a boiling water nuclear reactor.

BRIEF DESCRIPTION

Briefly, one aspect of the invention, a boiling water reactor comprises a reactor pressure vessel; a core shroud arranged concentrically inside the reactor pressure vessel to provide an annular downcomer forming a coolant flow path between a wall of the reactor pressure vessel and the core shroud; and a probe system for determining one of a water level and a flow velocity of fluid within the reactor.

Another aspect of the invention, a probe system for detecting a water level and flow velocity of coolant in a nuclear reactor comprises, in combination, a conductivity probe; and a time-domain reflectometer, wherein the probe system is at least partially arranged in a downcomer of the nuclear reactor.

In another aspect of the invention, a method for measuring a level and flow velocity of coolant in a downcomer of a boiling water reactor comprises the steps of:

measuring one of a conductivity and resistivity of the coolant within the downcomer of the reactor; and measuring a reflection time of an electromagnetic pulse to determine a level of the coolant within the downcomer of the reactor.

DRAWINGS

These and other features, aspects, and advantages of the present invention will become better understood when the following detailed description is read with reference to the accompanying drawings in which like characters represent like parts throughout the drawings, wherein.

Figure 4:
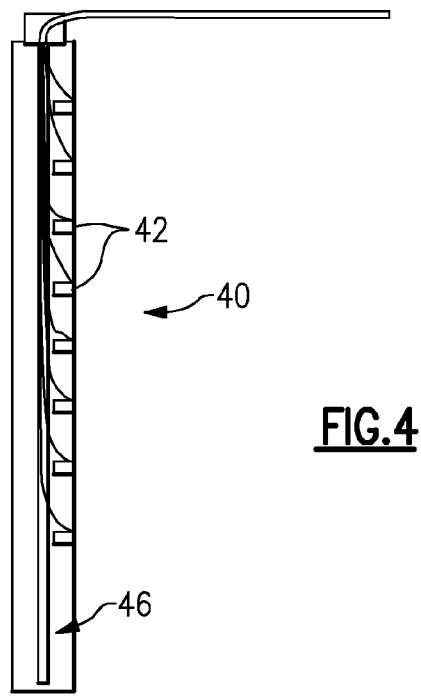
Figure 5:
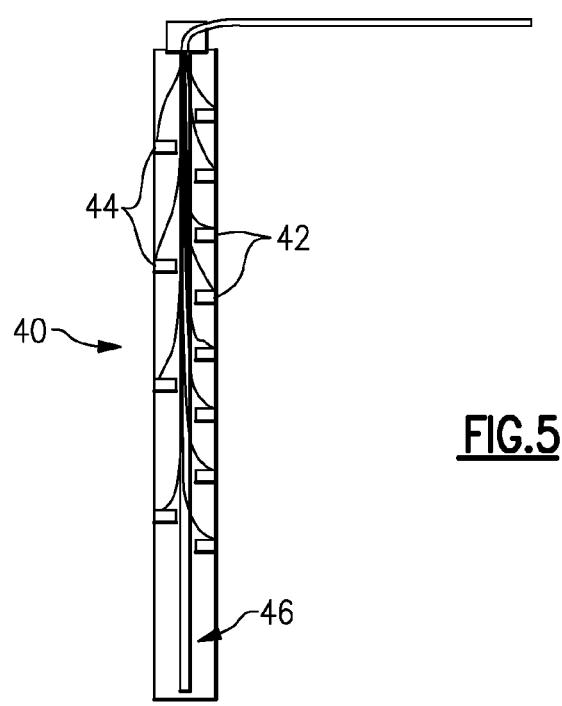

FIG. 4 is a side view of another possible combination of the probe system that includes a plurality of electrical conductivity (TC) probes at desired locations within the downcomer, and one or more time-domain reflectometer (TDR) probes; and FIG. 5 is a side view of yet another possible combination of the probe system that includes a plurality of thermal conductivity (TC) and electrical conductivity (EC) probes at desired locations within the downcomer, and one or more time-domain reflectometer (TDR) probes.

DETAILED DESCRIPTION

Figure 1:
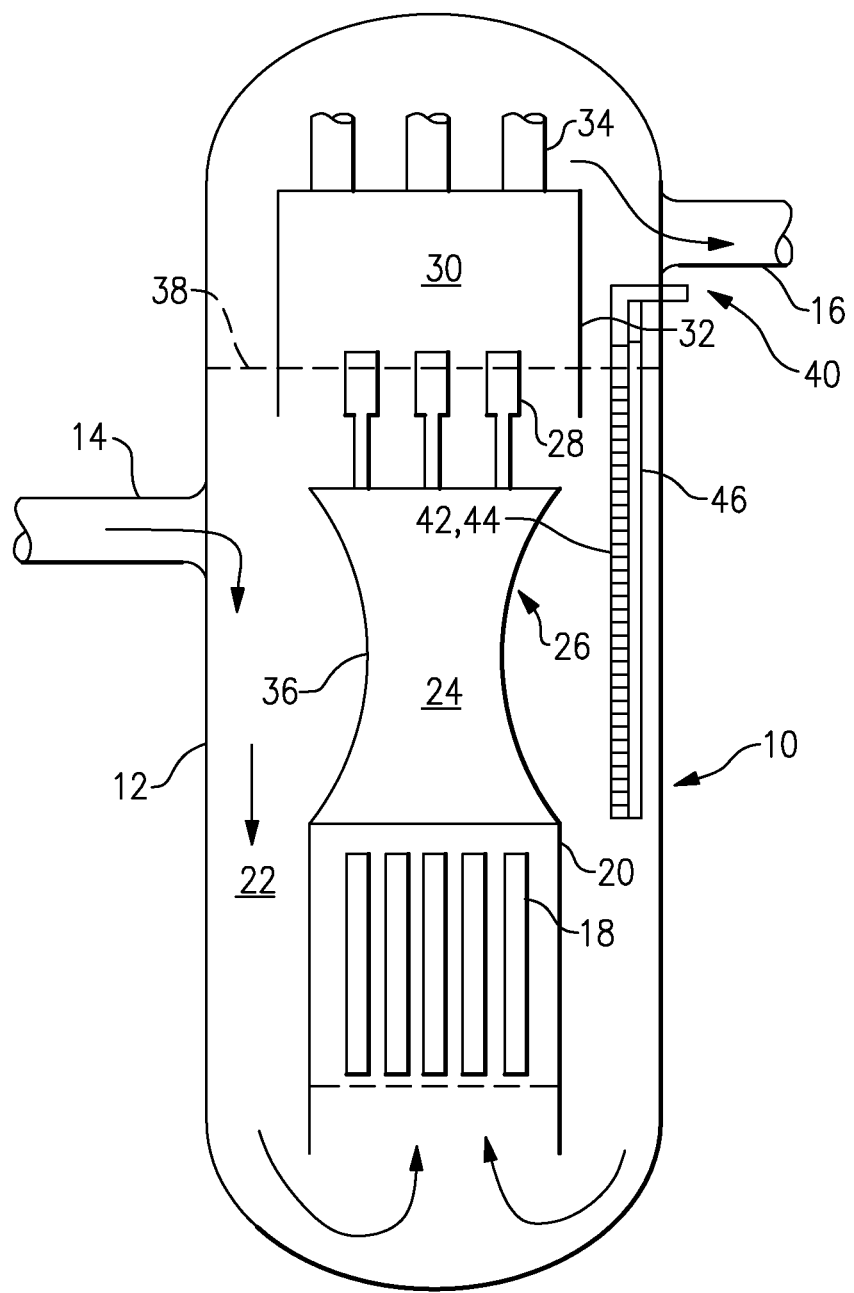
FIG. 1 is a diagram of a natural circulation type boiling water nuclear reactor incorporating a probe system for determining coolant level and flow velocity in the downcomer in accordance with an embodiment of the invention.

Referring to FIG. 1, a boiling water reactor 10 comprises a reactor pressure vessel 12 having a feedwater inlet 14 for the introduction of recycled steam condensate and/or makeup coolant into the vessel 12, and a steam outlet 16 for the discharge of produced steam for appropriate work, such as driving electricity-generating turbines.

A core of heat-producing fissionable fuel 18 is located within a lower area of the pressure vessel 12. The fuel core 18 is surrounded by a core shroud 20 spaced inward from the wall of the pressure vessel 12 to provide an annular downcomer 22 forming a coolant flow path between the vessel wall and the core shroud 20.

Superimposed above the fuel core 18 and the fuel core shroud 20 is an open area comprising the core outlet plenum 24 defined by either an open steam space 26 that extends upward from the fuel core shroud 20 to an upper portion of the reactor vessel 12. In some designs, the open steam space 26 may include a chimney 36. The chimney 36 (if present) and the fuel core shroud 20 are spaced radially inward from the wall of the reactor pressure vessel 12 to provide for the annular downcomer 22, which forms a coolant flow path between the vessel wall and the shroud 20 and the chimney 36 (if present) defining the fuel core 18 and the core outlet plenum 24, respectively.

Extending from the top portion of the open steam space 26 (or chimney 36, if present) or is a plurality of steam separators 28. Spaced a distance above the core outlet plenum 24 is an area comprising the wet steam plenum 30 defined by a peripheral shroud 32 with a top plate. Steam dryers 34 are mounted on the top plate for supplying separated and dried steam to steam outlet pipe 16.

Feedwater coolant enters the pressure vessel 12 through inlet 14 and mixes with cycling liquid water coolant separated from steam by the steam separators 28. The combined coolant water flows downward in the annular downcomer 22 between the side wall of vessel 12 and the shroud 20 and chimney 36 (if present) to the bottom portion of the vessel 12. The circulating coolant water then reverses its direction around the bottom of the core shroud 20 and flows upward through the lower core plenum and into and through the heat-producing core 18 of nuclear fuel, whereupon it emerges as a mixture of steam and liquid water into the core outlet plenum 24. This recycling circuit of coolant is maintained continuously during operation of the reactor to remove heat from the fuel core 18. The circulating coolant, comprising a mixture of steam and water from the fuel core, passes up through the core outlet plenum 24 and into the steam separators 28, where separated steam phase is directed on upward to the dryers 34 and the liquid water phase is shunted laterally to rejoin the circulating coolant water flowing downward through the annular downcomer 22 to again repeat the cycle.

As mentioned above, significant bundle natural circulation flow, which is nearly compatible to that of forced circulation BWR designs, can be achieved in some natural circulation boiling reactor designs, such as the Economic Simplified Boiling Water Reactor (ESBWR) design. One aspect of the invention is to provide an accurate measurement of the flow velocity or flow rate and the coolant level 38 of the circulating coolant water flowing downward through the annular downcomer 22, indicated by the arrows in FIG. 1. This is accomplished by providing a probe system, shown generally at 40, that is at least partially located within the downcomer 22 of the reactor 10.

In an embodiment, the probe system 40 comprises a combination of a plurality of electrical conductive (EC) probes 42 and/or a plurality of thermal conductivity (TC) probes 44 (also known as heated junction thermocouples (HJT), and one or more time-domain reflectometer (TDR) probes 46. The EC probes 42 with a fixed cell constant are used to measure the electrical conductivity or impedance of the surrounding medium. As the electrical properties of steam and water are dramatically different (steam is less conductive than water), and the location of each EC probe 42 is known, the composition of the coolant flowing downward through the annular downcomer 22 can be determined. By using a plurality of EC probes 42 vertically arranged at various known locations within the downcomer 22, the coolant level 38 over a larger region of the annular downcomer 22 can be determined at discrete points where the EC probes 42 are located. Thus, the electrical conductivity probes 42 provide an indication of the coolant level 38 above and below two adjacent discrete EC probe elevations, except in rare cases in which the coolant level 38 is discernibly located exactly at a probe location. An example of an EC probe 42 is a type commercially available from Solartron Mobrey Limited, Model No. TB/hyd009.

The TC (or HJT) probes 44 contain a plurality of resistance temperature devices that are employed to measure the thermal conductivity of the surrounding medium. As the thermal properties of steam and water are dramatically different (steam is less conductive than water), and the location of the probe 44 is known, the composition of the coolant flowing downward through the annular downcomer 22 can be inferred. By using a plurality of probes 44 vertically arranged at various known locations within the downcomer 22, the coolant level 38 over a larger region of the annular downcomer 22 can be determined at discrete points where the TC (or HJT) probes 44 are located. Thus, the TC probes 44 provide an indication of the coolant level 38 above and below two adjacent discrete TC probe elevations, except in rare cases in which the coolant level 38 is discernibly located exactly at a probe location. In addition, a flowing material, such as water or steam, strips more thermal energy from the probe 44. As such, the flow velocity of the coolant water flowing downward through the downcomer 22 can be determined. An example of a TC probe 44 is a type commercially available from Magnetrol International, Inc., Thermatel® Model No. TD1/TD2.

The TDR probe 46 emits one or more electromagnetic pulses down a cable or rod and measures the time delay of the pulse reflection that occurs due to dielectric differences between steam and water. As such, the TDR probe 46 is used to measure the liquid level of the coolant water flowing downward through the downcomer 22. Examples of TDR probes 44 are types commercially available from Magnetrol International, Inc., Eclipse® Enhanced Model No. 705, and Endress+Hauser, Inc., Model No. Levelflex M FMP41C and FMP45.

In operation, the probe system 40 comprises either a combination of EC probes 42 and TDR probes 46, or a combination of TC probes 44 and TDR probes 46, or a combination of EC probes 42, TC probes 44 and TDR probes 46. That is, the probe system 40 comprises a plurality of conductivity/resistivity probes (EC probes 42 and/or TC (or HJT) probes 44) and one or more TDR probes 46, thereby minimizing the number of penetrations needed in the reactor vessel 12. The EC probes 42 or TC (or HJT) probes 44 are placed at desired locations for point water level measurement in conjunction with the TDR probes 46. Both discontinuous measurements from the conductivity probes 42, 44 and continuous measurements from the one or more TDR probes 46 are used to calibrate and correct the measurement for the coolant level within the downcomer 22 of the reactor 10.

By combining the attributes of the technologies for each type of probe 42, 44, 46 into a unified probe system 40 for water level measurement and fluid velocity in the downcomer, the strengths of each type of probe are combined to provide a synergistic effect that optimizes response time, accuracy, fault determination and operation in a volatile (two phase) environment. Specifically, due to the relationship between dielectric constant and conductivity, the EC probes 42 can be used in concert with the one or more TDR probes 46 to correct for deviations in water conductivity that may alter the accuracy of the TDR probe 46.

In addition, for a multi-phase environment, for example, a steam and water environment, the changes in the dielectric constant influences the amplitude of the reflected impulse signal from the TDR probe 46, so the compensation from change in the conductivity change measured by the probes 42, 44 can be used to adjust the receiver sensitivity (and accuracy) of the TDR probe 46. Furthermore, in the case of a multi-phase environment where a foam layer exists between the steam and water layers, the combined information of the discrete conductivity probes 42, 44 and the continuous TDR probes 46 can be much more reliable and informative than measurements from conductivity probes and TDR probes alone. For example, the TDR probes 46 can measure the multiple reflections from the steam/foam interface and the foam/water interface, while the conductivity probes 42, 44 can confirm the measured information from the TDR probes 46 with different conductivity measurements from the steam layer, the foam layer and the water layer.

Figure 2:
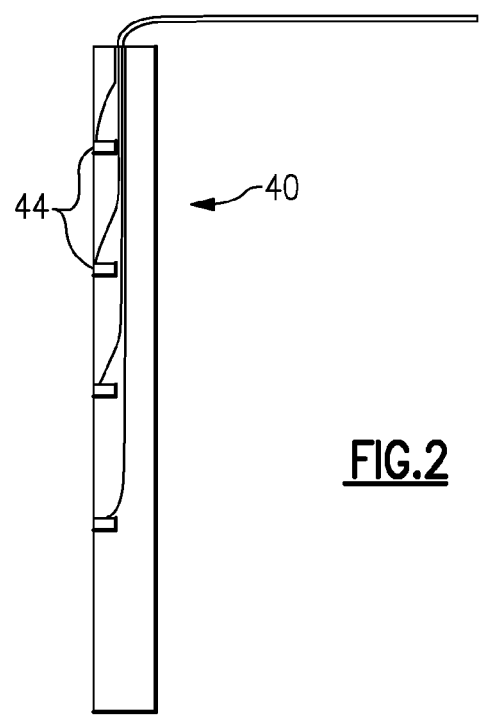
FIG. 2 is a side view of one possible combination of the probe system that includes a plurality of thermal conductivity (TC) probes at desired locations within the downcomer.

As mentioned above, the probe system 40 comprises a combination of a plurality of electrical conductive (EC) probes 42 and/or a plurality of thermal conductivity (TC) probes 44 (also known as heated junction thermocouples (HJT), and one or more time-domain reflectometer (TDR) probes 46. Referring now to FIGS. 2-5, the various combinations of the probe system 40 will now be described. One combination is shown in FIG. 2 in which the probe system 40 includes a plurality of TC probes 44 at desired locations that provide both discrete sensing of the coolant level and continuous sensing of coolant flow velocity within the downcomer 22 of the reactor 10.

Figure 3:
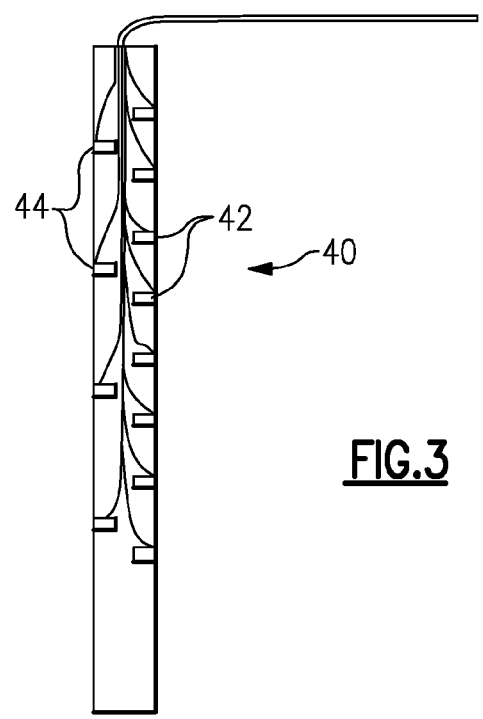
FIG. 3 is a side view of another possible combination of the probe system that includes a plurality of thermal conductivity (TC) probes and a plurality of electrical conductive (EC) probes at desired locations within the downcomer.

Another combination is shown in FIG. 3 in which the probe system 40 includes a plurality of EC probes 42 placed at desired locations that provide discrete sensing of the coolant level, and a plurality of TC probes 44 at desired locations that provide both discrete sensing of the coolant level and continuous sensing of coolant flow velocity within the downcomer 22 of the reactor 10.

Yet another combination is shown in FIG. 4 in which the probe system 40 includes a plurality of EC probes 42 placed at desired locations that provide discrete sensing of the coolant level, and a TDR probe 46 that extends from substantially the length of the probe system 40 for providing continuous sensing of the coolant level within the downcomer 22 of the reactor 10.

In yet another combination shown in FIG. 5, the probe system 40 includes a plurality of EC probes 42 placed at desired locations that provide discrete sensing of the coolant level, and a plurality of TC probes 44 placed at desired locations that provide both discrete sensing of the coolant level 38 and continuous sensing of coolant flow within the downcomer 22. The probe system 40 also includes a TDR probe 46 that extends from substantially the length of the probe system 40 for providing continuous sensing of the coolant level within the downcomer 22 of the reactor 10.

As described above, the probe system 40 determines the coolant level in the downcomer 22 of the reactor 10. Additionally the TC probes 44 allow the determination of flow velocity. By doing so, the probe system 40 eliminates the need for a differential pressure system that is required in conventional reactor designs, thereby reducing cost and complexity of the reactor design.

It will be appreciated that the invention is not limited by the location of the probe system 40, and that the invention can be used at other locations to determine the coolant level 38 and flow velocity for a two-phase coolant or a single-phase coolant. For example, the probe system 40 can be used to measure the water level and flow velocity in a steam generator of a pressurized water reactor (PWR).

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A probe system for detecting a coolant level and flow velocity in a nuclear reactor, in combination, comprises a conductivity probe; and a time-domain reflectometer probe, wherein the probe system is at least partially arranged in a downcomer of the nuclear reactor.

2. A boiling water reactor, comprising:
   a reactor pressure vessel;
   a core shroud arranged concentrically inside the reactor pressure vessel to provide an annular downcomer forming a coolant flow path between a wall of the reactor pressure vessel and the core shroud; and
   system as recited in claim 1 for determining one of a coolant level and a flow velocity within the reactor.

3. The reactor according to claim 2, wherein the conductivity probe comprises one of an electrical conductivity (EC) probe and a thermal conductivity (TC) probe.

4. The reactor according to claim 2, wherein the probe system is at least partially arranged within the downcomer of the reactor for determining the coolant level and the flow velocity within the downcomer of the reactor.

5. The reactor according to claim 2, wherein the boiling water reactor is a natural circulation boiling water reactor.

6. The probe system according to claim 1, wherein the conductivity probe comprises one of an electrical conductivity (EC) probe and a thermal conductivity (TC) probe.

7. The probe system according to claim 1, wherein the nuclear reactor comprises a boiling water nuclear reactor.

8. The probe system according to claim 7, wherein the boiling water nuclear reactor comprises a natural circulation boiling water reactor.

* * * * *

UNITED STATES PATENT AND TRADEMARK OFFICE
CERTIFICATE OF CORRECTION

PATENT NO. : 8,532,244 B2  Page 1 of 1
APPLICATION NO. : 11/762986
DATED : September 10, 2013
INVENTOR(S) : Brisson et al.

It is certified that error appears in the above-identified patent and that said Letters Patent is hereby corrected as shown below:

In the Claims

In Column 6, Lines 44-45, in Claim 2, delete "system as recited in claim 1 for determining one of a coolant level and a flow velocity within the reactor." and insert -- a probe system for determining one of a coolant level and a flow velocity within the reactor, the probe system, in combination, comprising a conductivity probe and a time-domain reflectometer probe, wherein the probe system is at least partially arranged in the annular downcomer of the boiling water reactor. --, therefor.

Signed and Sealed this
Fourth Day of February, 2014

Michelle K. Lee
*Deputy Director of the United States Patent and Trademark Office*